(12) United States Patent
Young et al.

(10) Patent No.: US 11,985,258 B2
(45) Date of Patent: May 14, 2024

(54) SPLIT CHAIN OF DIGITAL CERTIFICATES FOR SUPPLY CHAIN INTEGRITY

(71) Applicant: Dell Products, L.P., Round Rock, TX (US)

(72) Inventors: Jason Matthew Young, Round Rock, TX (US); Eugene David Cho, Austin, TX (US); Huijun Xie, Hopkinton, MA (US); Chandrashekar Nelogal, Round Rock, TX (US); Marshal F. Savage, Austin, TX (US); Viswanath Ponnuru, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 374 days.

(21) Appl. No.: 17/648,741

(22) Filed: Jan. 24, 2022

(65) Prior Publication Data

US 2023/0239165 A1    Jul. 27, 2023

(51) Int. Cl.
*H04L 9/32*  (2006.01)
*H04L 9/08*  (2006.01)

(52) U.S. Cl.
CPC .......... *H04L 9/3268* (2013.01); *H04L 9/0825* (2013.01); *H04L 9/3265* (2013.01); *H04L 2209/12* (2013.01)

(58) Field of Classification Search
CPC ... H04L 9/3268; H04L 9/0825; H04L 9/3265; H04L 2209/12; H04L 9/0891
See application file for complete search history.

(56) References Cited

U.S. PATENT DOCUMENTS

2018/0041341 A1*   2/2018   Gulati ................... H04L 9/0894

* cited by examiner

*Primary Examiner* — Michael Simitoski
*Assistant Examiner* — Hany S. Gadalla
(74) *Attorney, Agent, or Firm* — Fogarty LLP (57) ABSTRACT

Systems and methods provide validation of hardware components of an IHS (Information Handling System). An attestation certificate stored to the IHS specifies authenticated instructions for operation of a hardware component of the IHS. This attestation certificate is endorsed by a self-signed root attestation certificate. An identity certificate, also stored to the IHS, specifies an identity of the hardware component and is endorsed using an embedded keypair of the hardware component. The root attestation certificate is validated to ensure it corresponds to the hardware component specified in the identity certificate, where this validation confirms that a public key included in the identity certificate is identical to a public key included in the attestation certificate. Through use of the same public key by both certificates, the attestation certificate can be validated as corresponding to the identity certificate without accessing the embedded keypair of the hardware component used to sign the identity certificate.

20 Claims, 4 Drawing Sheets

SPLIT CHAIN OF DIGITAL CERTIFICATES FOR SUPPLY CHAIN INTEGRITY

FIELD

The present disclosure relates generally to Information Handling Systems (IHSs), and relates more particularly to IHS security.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHSs, such as mobile phones and tablets, are typically manufactured in large quantities and with few variations. For instance, for a particular model of mobile phone or tablet, hundreds of thousands of identical, or nearly identical, devices may be manufactured. Other types of IHSs, such as rack-mounted servers, are manufactured in much smaller quantities and are frequently manufactured and customized according to specifications provided by a specific customer that has contracted for the manufacture and delivery of the server. In such instances, an IHS may include standard components and may also include components specified by a customer that may configure the server to support specific functionality. For example, a customer may contract for manufacture and delivery of a server that includes security adaptations that will enable the server to securely process high volumes of financial transactions.

However, such security adaptations may be circumvented by malicious actors by surreptitiously replacing factory installed hardware components of an IHS with compromised hardware components, or uploading malicious instructions to these hardware components.

SUMMARY

In various embodiments, methods provide validation of hardware components of an IHS (Information Handling System). The methods may include: retrieving an attestation certificate that is stored to the IHS, wherein the attestation certificate specifies authenticated instructions for operation of a hardware component of the IHS, and wherein the attestation certificate is endorsed by a self-signed root attestation certificate; retrieving an identity certificate that is stored to the IHS, wherein the identity certificate specifies an identity of the hardware component, and wherein the identity certificate is endorsed using an embedded keypair of the hardware component; and validating that the root attestation certificate corresponds to the hardware component that is specified in the identity certificate by confirming that a public key included in the identity certificate is identical to a public key included in the attestation certificate.

In some method embodiments, the hardware component of the IHS comprises at least one of a storage controller, a network controller, a storage device, an FPGA (Field Programmable Gate Array) and a remote access controller. In some method embodiments, the identity of the hardware component included in the identity certificate is a unique identifier of the hardware component collected during the factory assembly of the IHS. In some method embodiments, the authenticated instructions for operation of the hardware component included in the attestation certificate comprise firmware instructions for operation by the hardware component. In some method embodiments, the hardware component comprises an SPDM (Security Protocol and Data Model) compliant hardware component. In some method embodiments, the embedded keypair of the hardware component is used by an Embedded Certificate Authority in the endorsement of the identity certificate. In some method embodiments, the root attestation certificate is validated as corresponding to the hardware component specified in the identity certificate without accessing the embedded keypair of the hardware component. In some method embodiments, the attestation certificate comprises a chain of attestation certificates, wherein the leaf attestation certificate of this chain validates the current instructions for use in validating the hardware component. Some method embodiments may further include authenticating the leaf attestation certificate by validating control by the root attestation certificate of a private key corresponding to a public key included in the leaf attestation certificate. Some method embodiments may further include validating an identity reported by the hardware component against the identity of the hardware component from the identity certificate. In some method embodiments, the identity of the hardware component from the identity certificate comprises a unique identifier for the hardware component that is collected during factory assembly of the IHS. Some method embodiments may further include validating instructions reported for use by the hardware component against the authenticated instructions specified by the attestation certificate. In some method embodiments, the authenticated instructions specified by the attestation certificate comprise firmware instructions for operation of the hardware component.

In various additional embodiments, computer-readable storage devices include instructions stored thereon for validating hardware components of an IHS (Information Handling System). Execution of the instructions by one or more processors causes the one or more processors to: retrieve an attestation certificate that is stored to the IHS, wherein the attestation certificate specifies authenticated instructions for operation of a hardware component of the IHS, and wherein the attestation certificate is endorsed by a self-signed root attestation certificate; retrieve an identity certificate that is stored to the IHS, wherein the identity certificate specifies an identity of the hardware component, and wherein the identity certificate is endorsed using an embedded keypair of the hardware component; and validate that the root attestation certificate corresponds to the hardware component that is specified in the identity certificate by confirming that a public key included in the identity certificate is identical to a public key included in the attestation certificate.

In some storage device embodiments, the hardware component of the IHS comprises at least one of a storage controller, a network controller, a storage device, an FPGA (Field Programmable Gate Array) and a remote access controller. In some storage device embodiments, the identity of the hardware component included in the identity certificate is a unique identifier of the hardware component collected during the factory assembly of the IHS. In some storage device embodiments, the authenticated instructions for operation of the hardware component included in the attestation certificate comprise firmware instructions for operation by the hardware component. In some storage device embodiments, the hardware component comprises an SPDM (Security Protocol and Data Model) compliant hardware component.

In various additional embodiments, IHSs (Information Handling Systems) may include: one or more processors; one or more memory devices coupled to the processors, the memory devices storing computer-readable instructions that, upon execution by the processors cause an operating system to run on the IHS; and a remote access controller comprising one or more logic units and further comprising one or more memory devices storing computer-readable instructions that, upon execution by the logic units, cause a pre-boot validation process to: retrieve an attestation certificate that is stored to the IHS, wherein the attestation certificate specifies authenticated instructions for operation of a hardware component of the IHS, and wherein the attestation certificate is endorsed by a self-signed root attestation certificate; retrieve an identity certificate that is stored to the IHS, wherein the identity certificate specifies an identity of the hardware component, and wherein the identity certificate is endorsed using an embedded keypair of the hardware component; and validate that the root attestation certificate corresponds to the hardware component that is specified in the identity certificate by confirming that a public key included in the identity certificate is identical to a public key included in the attestation certificate.

In some IHS embodiments, the hardware component comprises an SPDM (Security Protocol and Data Model) compliant hardware component.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
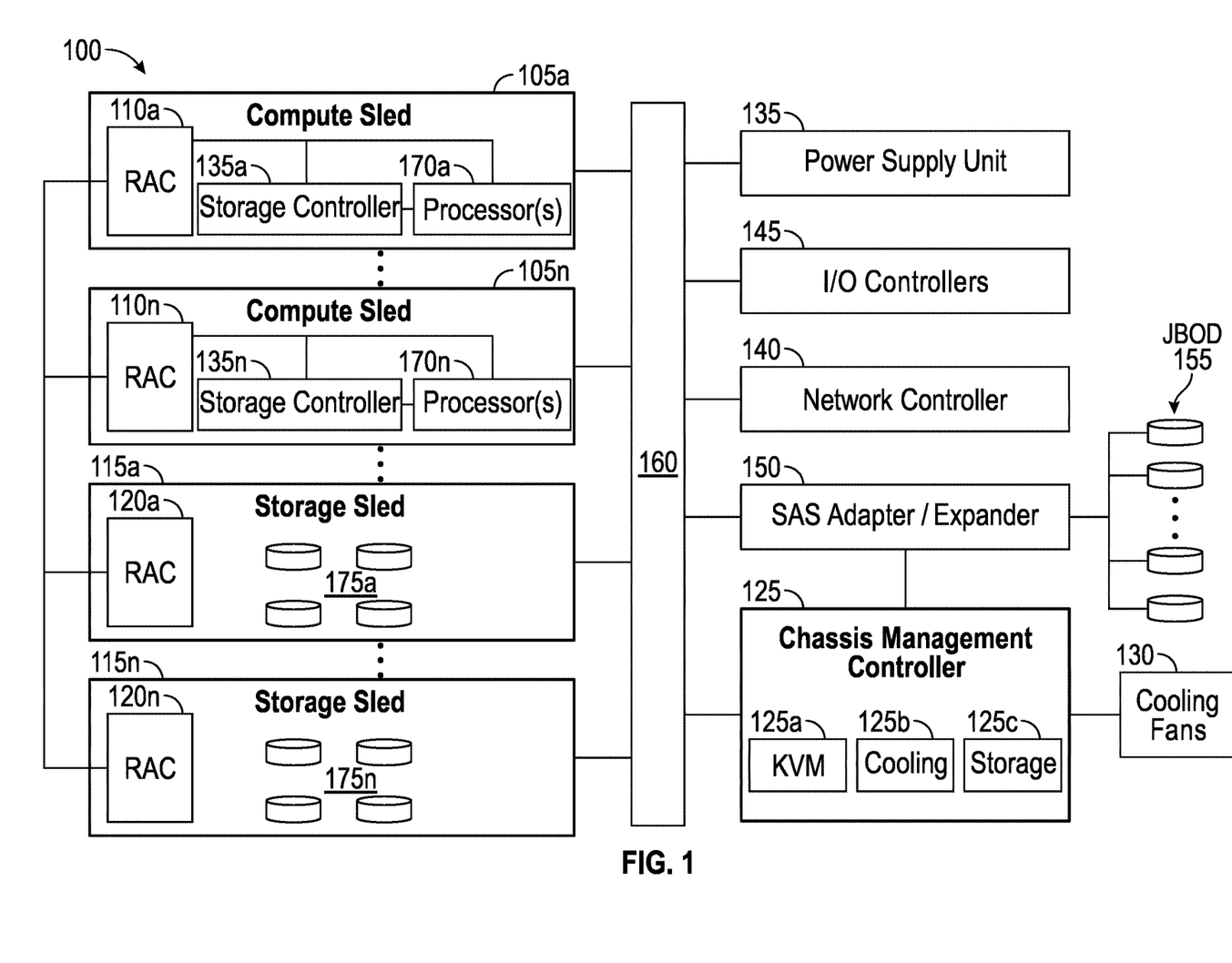
FIG. 1 is a diagram illustrating certain components of a chassis, according to some embodiments, for supporting validation of the integrity of the hardware components installed in the chassis using a split chain of digital certificates.

FIG. 1 is a block diagram illustrating certain components of a chassis 100 comprising one or more compute sleds 105a-n and one or more storage sleds 115a-n that may be configured to implement the systems and methods described herein for supporting validation of hardware components installed the chassis 100 using a split chain of digital certificates. Embodiments of chassis 100 may include a wide variety of different hardware configurations. Such variations in hardware configuration may result from chassis 100 being factory assembled to include components specified by a customer that has contracted for manufacture and delivery of chassis 100. As described in additional detail below, chassis 100 may include capabilities that allow a customer to validate the identity of hardware components of chassis 100 and to validate the instructions used by these hardware components, where these validations can be conducted without exposing cryptographic credentials of these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support use of a split chain of digital certificates in validation of the identity of backplane 160 and instructions used by components coupled to backplane 160, where one branch of the split chain of digital certificates is used to validate the identity of the backplane 160 and another branch is used to validate instructions used by the backplane 160.

Figure 2:
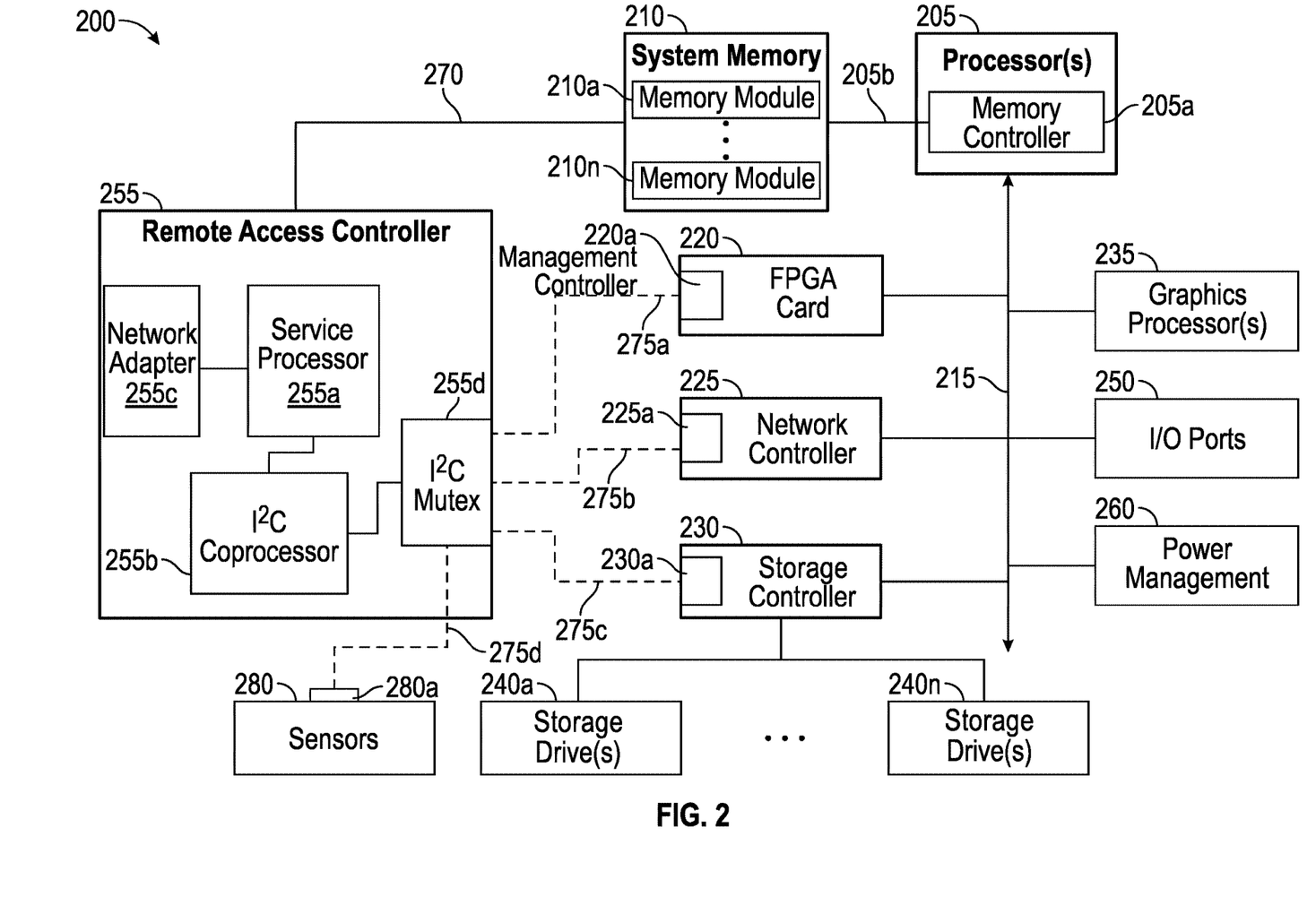
FIG. 2 is a diagram illustrating certain components of an IHS configured as a component of a chassis, according to some embodiments, for supporting validation of the integrity of hardware components installed in the IHS using a split chain of digital certificates.

In certain embodiments, a compute sled 105*a-n* may be an IHS such as described with regard to IHS 200 of FIG. 2. A compute sled 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications with various components of a compute sled 105*a-n* and chassis 100. Remote access controllers 110*a-n* may collect various types of sensor data, such as collecting temperature sensor readings that are used in support of airflow cooling of the chassis 100 and the sleds 105*a-n*, 115*a-n*. In addition, each remote access controller 110*a-n* may implement various monitoring and administrative functions related to compute sleds 105*a-n* that utilize sideband bus connections with various internal components of the respective compute sleds 105*a-n*. In some embodiments, each compute sled 105*a-n* installed in chassis 100 may be uniquely identified based on a code or other identifier that may be permanently encoded in a non-volatile memory of a respective compute sled 105*a-n* by its manufacturer. As described below, embodiments may support use of a split chain of digital certificates in validation of the identity of an individual compute sled 105*a-n* and instructions used by the compute sled 105*a-n*, where one branch of the split chain of digital certificates is used to validate the identity of a compute sled and another branch is used to validate instructions used by the compute sled.

Each of the compute sleds 105*a-n* may include a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drives 155 may each be uniquely identified based on a code or other identifier that may be permanently encoded in a non-volatile memory of the SAS expander or storage drive by its respective manufacturer. As described below, embodiments may support use of a split chain of digital certificates in validation of the identity of SAS expander 150 and/or storage drives 155 and instructions used by these components, where one branch of the split chain of digital certificates is used to validate the identity of these components and another branch is used to validate instructions used by these components.

As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 115*a-n* may be utilized in various storage configurations by the compute sleds 105*a-n* that are coupled to chassis 100. As illustrated, each storage sled 115*a-n* may include a remote access controller (RAC) 120*a-n* provides capabilities for remote monitoring and management of respective storage sleds 115*a-n*. In some embodiments, each storage sled 115*a-n* may be uniquely identified based on a code or other identifier that may be permanently encoded in a non-volatile memory of the respective storage sled 115*a-n* by its manufacturer. As described below, embodiments may support use of a split chain of digital certificates in validation of the identity of an individual storage sled 115*a-n* and instructions used by an individual storage sled 115*a-n*, where one branch of the split chain of digital certificates is used to validate the identity of the storage sleds and another branch is used to validate instructions used by the storage sleds 115*a-n*.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments may support use of a split chain of digital certificates in validation of the identity of network controller 140 and of instructions used by network controller 140, where one branch of the split chain of digital certificates is used to validate the identity of the network controller 140 and another branch is used to validate instructions used by network controller 140.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments may support use of a split chain of digital certificates in validation of the identity of power supply unit 135 and instructions used by power supply unit 135, where one branch of the split chain of digital certificates is used to validate the identity of power supply unit 135 and another branch is used to validate instructions used by power supply unit 135.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments may support use of a split chain of digital certificates in validation of the identity of I/O controllers 140 and of instructions used by I/O controllers 140, where one branch of the split chain of digital certificates is used to validate the identity of the I/O controllers 140 and another branch is used to validate instructions used by I/O controllers 140.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments may support use of a split chain of digital certificates in validation of the identity of chassis management controller 125 and instructions used by chassis management controller 125, where one branch of the split chain of digital certificates is used to validate the identity of the chassis management controller 125 and another branch is used to validate instructions used by the chassis management controller 125.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting validation of the integrity of individual hardware components of IHS 200 using a split chain of digital certificates. It should be appreciated that although the embodiments described herein may describe an IHS that is a compute sled or similar computing component that may be deployed within the bays of a chassis, other embodiments may be implemented via other types of IHSs that may also support validation of the secure assembly and delivery of the IHS 200 through validation of the integrity of components of the IHS. In the illustrative embodiment of FIG. 2, IHS 200 may be a computing component, such as compute sled 105a-n or other type of server, such as an 1RU rack-mounted server installed within a 2RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 according to embodiments may include capabilities that allow a customer to utilize a split chain of digital certificates to validate the identity of individual hardware components of IHS 200, as well as to validate the instructions utilized by these hardware components. Using the described split chain of digital certificates, these validations of individual hardware components can be conducted without exposing cryptographic credentials of the hardware components.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments may support use of a split chain of digital certificates in validation of the identity of FPGA card 220 and instructions used by FPGA card 220, where one branch of the split chain of digital certificates is used to validate the identity of the FPGA card 220 and another branch is used to validate instructions used by the FPGA card 220.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments may support use of a split chain of digital certificates in validation of the identity of network controller 225 and of instructions used by network controller 225, where one branch of the split chain of digital certificates is used to validate the identity of the network controller 225 and another branch is used to validate instructions used by the network controller 225.

IHS 200 may include one or more storage controllers 230 that may be utilized to access storage drives 240a-n that are accessible via the chassis in which IHS 200 is installed. Storage controllers 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In some embodiments, storage drives 240a-n may also be accessed by other IHSs that are also installed within the same chassis as IHS 200. Although a single storage controller 230 is illustrated in FIG. 2, IHS 200 may include multiple storage controllers that may operate similarly to storage controller 230. In embodiments where storage drives 240a-n are hot-swappable devices that are received by bays of chassis, the storage drives 240a-n may be coupled to IHS 200 via couplings between the bays of the chassis and a midplane or backplane 245 of IHS 200. Storage drives 240*a-n* may include SAS (Serial Attached SCSI) magnetic disk drives, SATA (Serial Advanced Technology Attachment) magnetic disk drives, solid-state drives (SSDs) and other types of storage drives in various combinations. In some embodiments, storage controllers 230 and storage drives 240*a-n* may each be uniquely identified based on a code or other identifier that may be permanently encoded in a non-volatile memory of these devices by their respective manufacturers. As described below, embodiments may support use of a split chain of digital certificates in validation of the identity of storage controllers 230 and/or storage drives 240*a-n* and instructions used by these components, where one branch of the split chain of digital certificates is used to validate the identity of these components and another branch is used to validate instructions used by these components.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as described operations for using split chains of digital certificates in the validation of hardware components of the IHS, may operate using validated instructions, and thus within the root of trust of IHS 200. In some embodiments, remote access controller 255 may be uniquely identified based on a code or other identifier that may be permanently encoded in a non-volatile memory of the remote access controller 255 by its manufacturer. Embodiments may also support validation of the identity of remote access controller 255, and of instructions utilized by remote access controller 255 using of a split chain of digital certificates, where one branch of the split chain of digital certificates is used to validate the identity of the remote access controller 255 and another branch is used to validate instructions used by the remote access controller 255.

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-d* that may be individually established with each of the respective managed devices 220, 225, 230, 280 through the operation of an I2C multiplexer 255*d* of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

As described, various hardware components of an IHS 200 may be authenticated via the use of a split chain model of certificates. The SPDM (Security Protocol and Data Model) specification specifies protocols for authenticating devices of computer systems, such as the components of the IHS described above. In particular the SPDM specification includes two digital certificate models—a component identity certificate model and an attestation certificate model. In the SPDM specification, the device certificate model includes a leaf certificate at the end of the certificate chain that extends from a root certificate, where the root certificate is signed by a trusted authority and the leaf certificate may be used to authenticate the identity of a device. The device certificate is typically immutable and is valid for the useful life of the device. The attestation certificate model supports a mutable certificate chain for attesting to the configuration of a device, with the leaf certificate at the end of the chain being a certificate that may be used to authenticate firmware or any other instructions in use by the device. An attestation certificate is thus characterized with a shorter validity since it may be replaced with another leaf certificate that authenticates updated instructions for the device. In such SPDM certificate chains, as the instructions for use by a device are updated, the device certificate may be used to endorse new attestation certificates in generating new leaf certificates that are used to validate that the device is operating using authentic updates to the firmware or other instructions provided for the device. Used in this manner, the device certificate may be used to implement an Embedded Certificate Authority (ECA) that is used to sign new leaf certificates in the attestation chain that is used to provide assurances as to the integrity of updated instructions for use by the device.

However, use of the device certificate as an ECA in this manner poses certain risks. An entity relying on an attestation certificate relies on the assumption that the private key used by the ECA has not been compromised. In order to ensure that the private key used by the ECA has not been compromised, the entity seeking validation of the attestation certificate requires validation of ownership of the private key utilized by the platform key, thus requiring that ECA access the private key for use in responding to a cryptographic challenge, thus exposing the private key each time an attestation certificate is validated by the ECA. The entity relying on an attestation certificate also relies on the assumption that, in generating the attestation certificate, the ECA has endorsed authentic instructions for the device and not compromised instruction.

These vulnerabilities are particularly important for several reasons. If the ECA capabilities that utilize the device certificate are compromised, the ECA could be used to sign requests for attestation certificates for any number of hardware components, which may be compromised components. When compromised in this manner, these attestation certificates are chained back to the root certificate of the device certificate chain, and thus back to the organization that issued the root certificate. Accordingly, when the private key used by the ECA to endorse attestation certificates is compromised, a malicious actor can use that key to endorse any number of compromised certificates, which in turn could be used as ECAs to endorse additional compromised attestation certificates, which all ultimately chain back to the root certificate of the issuing entity.

Embodiments address these security vulnerabilities in SPDM certificate chains by instead utilizing a split chain of certificates, where one branch of the chain serves to identify a hardware component and the other branch of the chain serves to authenticate the instructions used by the hardware component. As described below, in a split chain certificate model according to embodiments the two chains may be linked through use of the same credentials for a leaf certificate of the branch providing a certificate for identifying a component and for a root certificate of the branch providing attestation of the instructions used by the component. The roof certificate of the attestation branch may be used to sign additional leaf attestation certificates of that chain as the instructions for use by the component are updated. This avoids any use of the ECA capabilities of a device, thus preventing its misuse. Additionally, through use of common credentials between these two certificates in each branch of the chain, an entity validating authenticity of an attestation certificate can also validate the authenticity of the identity certificate by confirming the identity certificate utilizes the same credentials as the validated root certificate of the attestation chain.

Figure 3:
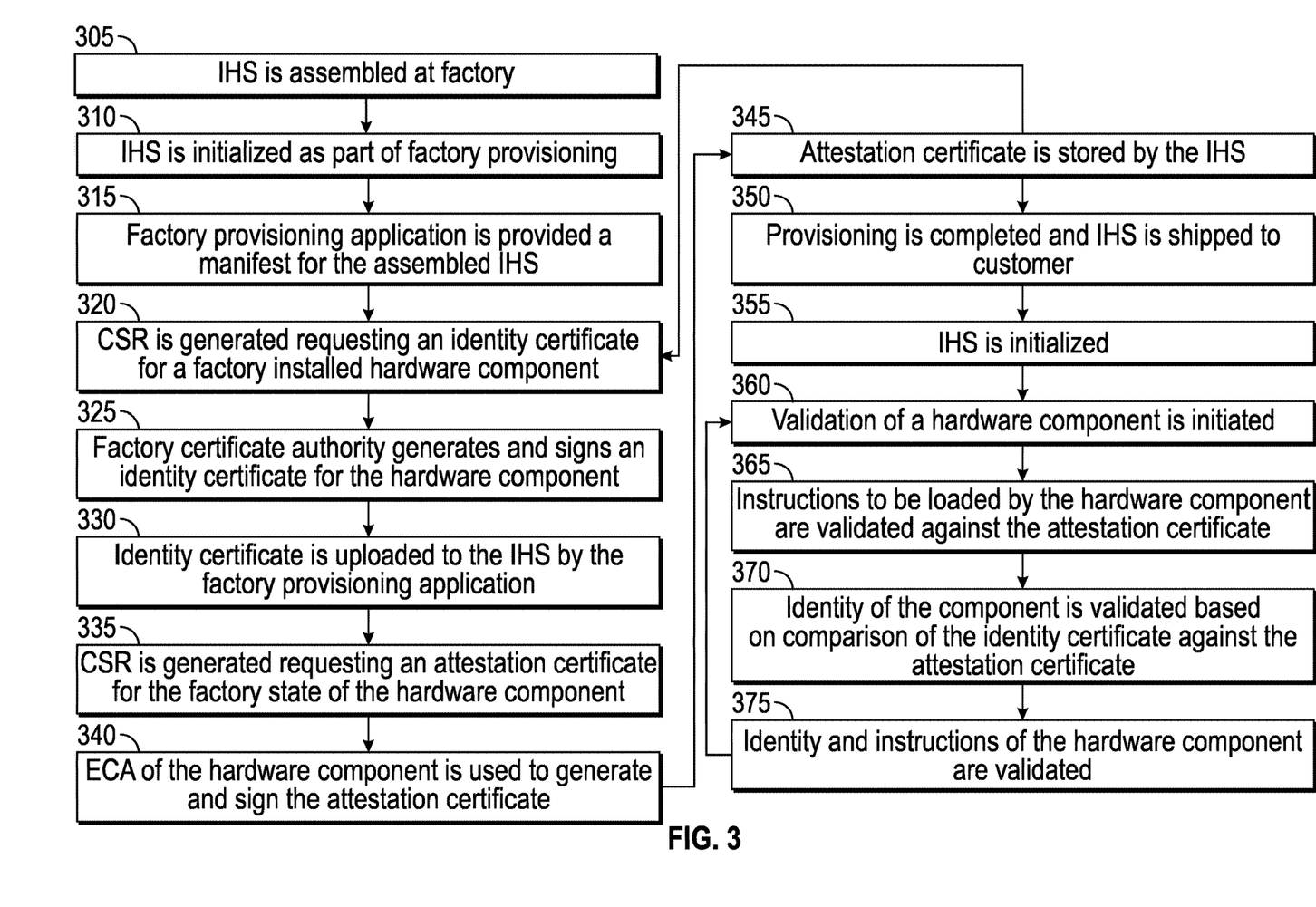
FIG. 3 is a flowchart describing certain steps of a method, according to some embodiments, for provisioning an IHS in a manner that supports using split chain of digital certificates for validating the integrity of hardware components of the IHS.
Figure 4:
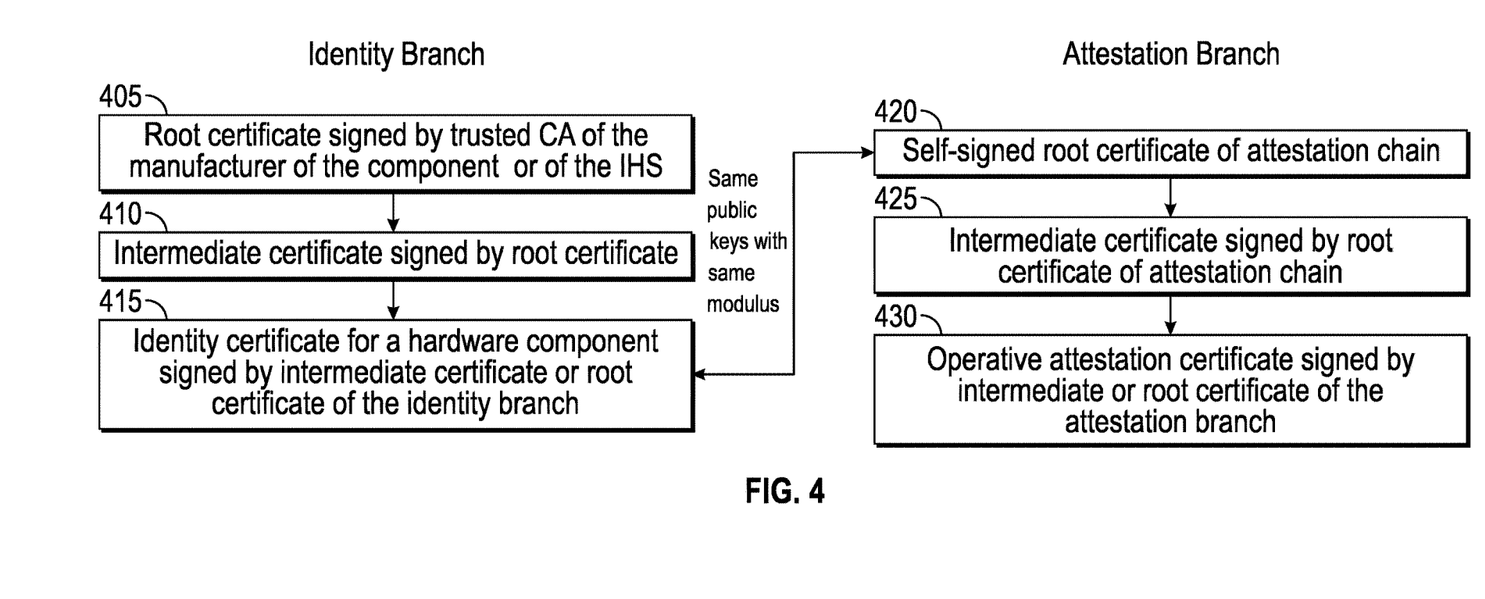
FIG. 4 is a diagram illustrating a split chain digital certificate model, according to embodiments, for use in validating the integrity of a hardware component of an IHS.

FIG. 3 is a flowchart describing certain steps of a method, according to some embodiments, for provisioning an IHS in a manner that supports using split chain of digital certificates for validating the integrity of hardware components of the IHS. FIG. 4 is a block diagram illustrating a split chain certificate model configured according to certain embodiments, such as using the process described in FIG. 3. Using the split chain of certificates of FIG. 4, the identity and instructions of an individual hardware component of an IHS may be separately validated though the use of separate branches of the split chain of certificates, where both validations utilize a set of cryptographic credentials that are shared between the two branches of the chain.

Some embodiments of the method of FIG. 3 may begin, at block 305, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

In some embodiments, some of these hardware components installed in the IHS during factory assembly may be themselves provisioned by their manufacturers with credentials for use in validating instructions used by the component. For instance, various hardware components of an IHS, such as described with regard to FIGS. 1 and 2, may be received from their respective manufacturers already provisioned with embedded credentials that may be used by the hardware component to operate as embedded certificate authorities (ECAs). In some embodiments, a hardware component may also be provisioned with an identity certificate that is stored in a persistent memory of the hardware component and may be retrieved in order to authenticate the hardware component. In some embodiments, a hardware component may be further provisioned with an attestation certificate that is also stored in a persistent memory of the hardware component and may be retrieved in order to authenticate instructions or other configuration data that will be loaded and used in the operation hardware component.

As described in additional detail below, such certificates may be provided according to embodiments within a split chain of digital certificates in which an attestation certificate branch of the chain can be augmented with additional leaf certificates as the instructions for use by the hardware component are modified during the operational life of the component. The other branch of the chain includes the identity certificate that authenticates the identity reported by the component, where this identity certificate may be signed using the embedded credentials of the component. Through the use of a split chain of certificates described herein, both the operative attestation certificate in the attestation branch of the chain and the identity certificate may both be validated without exposing the embedded credentials of the hardware component. In some embodiments, some of the hardware components installed in an IHS during factory assembly may be provisioned in full or in part by their manufacturers with a split chain of certificates as described herein. In some embodiments, some or all of this provisioning of a split chain of digital certificates for a factory installed hardware component may be conducted during factory provisioning of the IHS.

Once the assembly of an IHS has been completed, the IHS may be subjected to manual and automated inspections that confirm the IHS has been properly assembled and does not include any defects. After confirming an IHS has been assembled without any manufacturing defects, at block 310, factory provisioning of the IHS may be initiated. In some instances, the provisioning of an IHS at the factory may include various stages that may include stages for loading of firmware, configuring hardware components, and installing an operating system and other software. Various different aspects of this factory provisioning process may be conducted using a factory provisioning application, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 315, a manifest generated during assembly of an IHS is provided to the factory provisioning application that is being used to provision the assembled IHS. Based on this hardware manifest information, the factory provisioning application may initiate the generation of a split chain of certificates for some of the factory-installed hardware components, where each split chain may be used to validate one of these components of the IHS.

At block 320, for each hardware component of an IHS that will be configured according to embodiments, the factory provisioning application may generate a certificate signing request (CSR) for a digital identity certificate, where the request specifies the identity of a hardware component, such as provided in the manifest generated during assembly of the IHS. The CSR also specifies a public key of a keypair controlled by the hardware component, such as a public key of the described embedded keypair of a hardware component. In some embodiments, the embedded keypair may be generated by, or on behalf of, the factory provisioning application and stored to a hardware component of the IHS that is being configured to operate using a split chain of digital certificates. In some embodiments, the embedded keypair for a hardware component may be generated through the use of cryptographic libraries operated a trusted component of the IHS that is being provisioned, such as by the remote access controller or TPM of the IHS of FIG. 2.

The CSR for the requested identity certificate may then be transmitted to a factory certificate authority.

Upon receipt of the CSR, at block 325, the factory certificate authority generates a digital identity certificate 415 that is associated with the embedded keypair of the hardware component and that specifies the identity of the component. In some embodiments, the factory certificate authority submits the generated platform certificate for signing by a hardware security module that may be a dedicated hardware component of a factory provisioning server that safeguards cryptographic keys and implements cryptographic functions utilized in the factory provisioning process. The hardware security module may utilize a root key associated with the manufacturer in order to digitally sign the identity certificate. In such scenarios, the generated identity certificate would be chained directly to the root certificate 405, where this root certificate may be controlled by the manufacturer of the IHS or by a manufacturer of the component being provisioned. If an identity certificate 415 is chained directly to a root certificate 405, validation of signatures included in the identity certificate 415 would be authenticated using private credentials of the root certificate 405, thus exposing to some degree the private keys associated with this root certificate. As described, for root keys maintained by an IHS or hardware component manufacturer, such private keys are typically heavily safe guarded.

Accordingly, in many embodiments, the identity certificate 415 for a component may instead be signed by an intermediary certificate 410. As indicated in FIG. 4, an intermediary certificate 410 may be signed by the keypair that is endorsed by the root certificate 405. In this chain that includes an intermediary certificate 410 as the signer of the identity certificate 415, validation of the signature in identity certificate 415 does not require use of the root key, thus reducing exposure of the root key. In such embodiments, the factory provisioning application may submit the CSR for generation of the identity certificate 415 for a hardware component to an intermediary certificate authority 410, which generates and signs the identity certificate 415 using a keypair controlled by the intermediary certificate authority. Although FIG. 4 only illustrates a single intermediary certificate 410, embodiments may utilize any number of intermediary certificates that are chained and used in this same manner in further isolating the root key.

Once the identity certificate 415 has been generated and signed, at 330, the identity certificate for a hardware component is than loaded to the assembled IHS by the factory provisioning application. In some embodiments, the identity certificate 415 may be loaded to a secure memory of the IHS, such as a secured persistent storage controlled by a remote access controller to by a TPM of the IHS, as described with regard to FIG. 1. In some embodiments, the identity certificate 415 may be loaded to a persistent storage of the hardware component itself. As illustrated in FIG. 3, this identity certificate 415 is part of one branch of the split chain of certificates for use in validating a hardware component. In the other branch, a chain of attestation certificates 420, 425, 430 is used to attest to authenticated states of the component, where the component state may be represented by the instructions, or by any other configurable data, utilized in the operation of the component.

In generating a chain of attestation certificate for a hardware component, at 335, the factory provisioning application may generate another CSR for a certificate usable as a root certificate 420 of the attestation chain. The CSR for the root certificate 420 of the attestation chain includes the same public key that was submitted in the CSR for the identity certificate 415. As described in additional detail below and as illustrated in FIG. 4, the endorsement of this same keypair by both the identity certificate 415 and the root certificate 420 of the attestation chain serves to link the two branches of the split chain of certificates. Upon receipt of this CSR, at 340, the hardware component generates a self-signed attestation certificate that services as the root certificate 420 for the attestation chain. As indicated in FIG. 4, the root certificate 420 of the attestation chain may endorse an intermediary certificate 425. In some instances, an intermediary certificate may attest to authenticated instructions and other configuration data for the component, but these instructions and data have been replaced by updated instructions and data for the component. Since these updated instructions and data for the component are attested in a leaf certificate 430 of the attestation chain, the intermediary certificate 425 is no longer the operative certificate for authenticating the operating state of the component. However, upon receipt of a CSR for an updated attestation certificate, the intermediary certificate 425 serves as the certificate authority that generates and signs the operative attestation certificate 430.

Although FIG. 4 only illustrates a single intermediary attestation certificate 425, embodiments may utilize any number of intermediary certificates that are chained to form the attestation branch, where this attestation branch of the chain is augmented as the instructions for use by a component are updated. Initially, the operative attestation certificate 430 may specify the factory provisioned instructions, such as firmware, for use by a component. In such scenarios, successful validation of the instructions to be loaded and used by a component against the operative attestation certificate 430 confirms that the component is utilizing the factory provisioned instructions for that component. Over time, however, various modifications may be required to the instructions to be used by a component, thus resulting in the operative attestation certificate 430 transitioning to an intermediary certificate that endorses the new operative certificate.

At 345, the chain of attestation certificates 420, 425, 430, is stored by the IHS. In some instances, the chain of attestation certificates will be stored in a secured storage of the IHS, such as a persistent storage of the remote access controller or TPM. In other instances, the chain of attestation certificates may be stored directly to a persistent memory of the IHS. Once stored, the operative attestation certificate 430, which is the leaf certificate in the attestation branch of the split chain of certificates, may be used to validate the authenticity of instructions to be loaded and run in the operation of the hardware component. As indicated in FIG. 3, this process for generating a split chain of identity and attestation certificates may be repeated for multiple of the factory installed hardware components of the IHS. Once this provisioning of digital certificates has been completed for all hardware components and all other provisioning of the IHS has been completed, at 350, the IHS may be shipped or otherwise provided to a customer for deployment.

Now in possession and control of the customer receiving the IHS, at 355, the IHS is initialized. As described, particularly damaging cyberattacks may be perpetuated by replacing factory-installed hardware components of an IHS with compromised components, or by uploading malicious instructions to hardware components of the IHS, all prior to the IHS being put into service by the customer. The customer receiving the IHS is typically completely unaware that the integrity of the supply chain used to deliver the IHS to the customer has been compromised, thus compromising the IHS, the user's data and possibly entire systems of IHSs, such as an entire datacenter or an entire enterprise network. Accordingly, at 360, the IHS may initiate procedures for validating both the identity of a detected hardware component of the IHS and of the instructions that will be loaded and used to operate the hardware component. In some embodiments, the validation procedures may be initiated by a validation process operated by a remote access controller of the IHS, such as described in FIG. 2, while the IHS remains in a pre-boot validation state.

In validating the state of the hardware component, at 365, the validation process retrieves the operative attestation certificate 430 of the attestation chain. As described, the operative attestation certificate 430 is the leaf certificate in the attestation chain. Also as described, initially, the operative attestation certificate 430 may specify factory provisioned instructions for that component. Over time, the operative attestation certificate 430 may be replaced another operative certificate due to updated instructions being provided for a component, where the updated instructions have been provided by a trusted entity and securely uploaded to the hardware component. Upon loading the operative attestation certificate 430, this certificate may be validated as being issued by a trusted certificate authority. The validation process of the IHS may utilize the public key provided in the operative attestation certificate 430 in order to generate a challenge by which an intermediate attestation certificate authority 425 may prove ownership of the keypair used to sign the operative attestation certificate 430. The validation process may continue up the attestation chain in order to validate the signing of the intermediate attestation certificate 425 by the root certificate 420 of the attestation branch of the certificate chain. Since the root certificate 420 of the attestation branch is a self-signed certificate, this validation of digital signatures of the root certificate 420 is accomplished through use of the private key of the root certificate.

If the attestation chain of certificates is validated, the instructions to be loaded by the hardware component are authenticated against the signed instructions specified in the operative attestation certificate 430. In some embodiments, the validation process operated by the remote access controller may identify the instructions and other configuration data to be loaded and used by the hardware component and may calculate a digital signature from this information, in some scenarios relying on cryptographic capabilities of the TPM of the IHS. This generated digital signature may then be compared against the signature that is specified in the operative attestation certificate 430. Initially, the signed instructions of the operative attestation certificate 430 correspond to the factory provisioned instructions for this hardware component. Over time, the attestation chain may be augmented such that the operative attestation certificate 430 may specify updated instructions for the hardware component. In such instances, the operative attestation certificate 430 is used to sign a new attestation certificate specifying the updated instructions, where the new attestation certificate becomes the operative certificate for this chain and the former operative attestation certificate becomes an intermediate attestation certificate 425.

If the attestation certificate is validated and the instructions in use by the hardware component are successfully authenticated versus the signed instructions provided by the operative attestation certificate 430, at 470, the validation process authenticates the identity of the component using the identity certificate 415. In existing certificate models that include a single chain of certificates that includes both an identity certificate and an attestation certificate in that chain, the identity certificate would be validating based on challenges issued to the signing authority of the identity certificate, which may be the root certificate of the identity branch of the certificate chain. However, in such existing systems, each validation of the identity certificate would thus require exposing the credentials of the signing authority, which may be a root certificate. Also in such existing systems, in order to complete validation of the entire certificate chain of an attestation certificate, the identity certificate may also require validation, thus exposing the root credentials for every complete validation of an attestation certificate.

In embodiments, however, the identity of the hardware component may instead be validated by confirming the identity certificate 415 endorses the same key as endorsed by the root certificate 420 of the attestation chain. As described above, during provisioning of the IHS and/or component, a CSR used to request the identity certificate 415 of a hardware component specifies a public key, where this same public key is also included in the CSR that is used to create the root certificate 420 of the attestation branch of the split chain of certificates. Since the root certificate 420 of the attestation branch is a self-signed certificate, it cannot be externally validated. Accordingly, even if the attestation certificates in the attestation chain are all validated and the instructions in use by a component are also validated, further validation of the attestation certificate chain is required in order to confirm the root attestation certificate 420 is bound to this particular component. As such, when the IHS and/or component is provisioned with a split chain of certificates, the self-signed root certificate 420 of the attestation branch may be validated as bound to the certificates in the identity branch of the split chain through confirmation that the public key endorsed by the root attestation certificate 420 is the same public key endorsed by the identity certificate 415 of the component.

When the public keys of the two certificates 415, 420 are confirmed as identical, the private keys of the two certificates 415, 420 will also be identical. As indicated in FIG. 4, in some embodiments, the public keys of the two certificates 415, 420 may be evaluated based on calculation of a modulus that determines whether cryptographic credentials, such as public keys, are identical. When the calculated modulus for the two public keys of the certificates 415, 420 is zero, the two public keys are identical and correspond to the same private key. Through such validations the root certificate of the attestation chain can be confirmed as bound to this particular hardware component, where this validation is accomplished without having to validate the certificates of the identity branch of certificates, and thus without having to expose the embedded credentials of the component that were used to sign the identity certificate.

If the instructions in use by the IHS are successfully authenticated against the instructions specified by the operative attestation certificate 430 and the root attestation certificate 420 is confirmed as being bound to the identity certificate chain, at 375, the identity and instructions in use by the hardware component are authenticated. Embodiments support such validations of a hardware component through use of a keypair that is endorsed in both the identity branch and the attestation branch of the certificate chain, where these validations do not expose the embedded key of the hardware component. Without exposing the embedded key of the hardware component, the ECA capabilities of the hardware component cannot be invoked, thus preventing the embedded key from being compromised and used to sign any certificates, such as certificates presented by malicious actors. As described, in compromising the ECA capabilities of a hardware component, a malicious actor may generate seemingly valid identity certificates, which can themselves be used to sign other certificates. However, since embodiments preclude use of the hardware component's ECA when validating an attestation certificate, such validations do not pose a risk of the ECA being compromised. When the identity and attestation certificates are both validated, these validations provide assurances of the secure assembly and delivery of the IHS and, in particular, that each of the hardware components validated according to the embodiments described herein is an authentic hardware component and is operating using authentic instructions.

\*\*\*

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for validating hardware components of an IHS (Information Handling System), the method comprising:
retrieving an attestation certificate that is stored to the IHS, wherein the attestation certificate specifies authenticated instructions for operation of a hardware component of the IHS, and wherein the attestation certificate is endorsed by a self-signed root attestation certificate;
retrieving an identity certificate that is stored to the IHS, wherein the identity certificate specifies an identity of the hardware component, and wherein the identity certificate is endorsed using an embedded keypair of the hardware component; and
validating that the root attestation certificate corresponds to the hardware component that is specified in the identity certificate by confirming that a public key included in the identity certificate is identical to a public key included in the attestation certificate.

2. The method of claim 1, wherein the hardware component of the IHS comprises at least one of a storage controller, a network controller, a storage device, an FPGA (Field Programmable Gate Array) and a remote access controller.

3. The method of claim 1, wherein the identity of the hardware component included in the identity certificate is a unique identifier of the hardware component collected during the factory assembly of the IHS.

4. The method of claim 1, wherein the authenticated instructions for operation of the hardware component included in the attestation certificate comprise firmware instructions for operation by the hardware component.

5. The method of claim 1, wherein the hardware component comprises an SPDM (Security Protocol and Data Model) compliant hardware component.

6. The method of claim 1, wherein the embedded keypair of the hardware component is used by an Embedded Certificate Authority in the endorsement of the identity certificate.

7. The method of claim 1, wherein the root attestation certificate is validated as corresponding to the hardware component specified in the identity certificate without accessing the embedded keypair of the hardware component.

8. The method of claim 1, wherein the attestation certificate comprises a chain of attestation certificates, wherein the leaf attestation certificate of this chain validates the current instructions for use in validating the hardware component.

9. The method of claim 8, further comprising: authenticating the leaf attestation certificate by validating control by the root attestation certificate of a private key corresponding to a public key included in the leaf attestation certificate.

10. The method of claim 1, further comprising: validating an identity reported by the hardware component against the identity of the hardware component from the identity certificate.

11. The method of claim 10, wherein the identity of the hardware component from the identity certificate comprises a unique identifier for the hardware component that is collected during factory assembly of the IHS.

12. The method of claim 1, further comprising: validating instructions reported for use by the hardware component against the authenticated instructions specified by the attestation certificate.

13. The method of claim 12, wherein the authenticated instructions specified by the attestation certificate comprise firmware instructions for operation of the hardware component.

14. A computer-readable storage device having instructions stored thereon for validating hardware components of an IHS (Information Handling System), wherein execution of the instructions by one or more processors causes the one or more processors to:

retrieve an attestation certificate that is stored to the IHS, wherein the attestation certificate specifies authenticated instructions for operation of a hardware component of the IHS, and wherein the attestation certificate is endorsed by a self-signed root attestation certificate;

retrieve an identity certificate that is stored to the IHS, wherein the identity certificate specifies an identity of the hardware component, and wherein the identity certificate is endorsed using an embedded keypair of the hardware component; and validate that the root attestation certificate corresponds to the hardware component that is specified in the identity certificate by confirming that a public key included in the identity certificate is identical to a public key included in the attestation certificate.

15. The computer-readable storage device of claim 14, wherein the hardware component of the IHS comprises at least one of a storage controller, a network controller, a storage device, an FPGA (Field Programmable Gate Array) and a remote access controller.

16. The computer-readable storage device of claim 14, wherein the identity of the hardware component included in the identity certificate is a unique identifier of the hardware component collected during the factory assembly of the IHS.

17. The computer-readable storage device of claim 14, wherein the authenticated instructions for operation of the hardware component included in the attestation certificate comprise firmware instructions for operation by the hardware component.

18. The computer-readable storage device of claim 14, wherein the hardware component comprises an SPDM (Security Protocol and Data Model) compliant hard component.

19. An IHS (Information Handling System) comprising:
one or more processors;
one or more memory devices coupled to the processors, the memory devices storing computer-readable instructions that, upon execution by the processors cause an operating system to run on the IHS; and
a remote access controller comprising one or more logic units and further comprising one or more memory devices storing computer-readable instructions that, upon execution by the logic units, cause a pre-boot validation process to:
retrieve an attestation certificate that is stored to the IHS, wherein the attestation certificate specifies authenticated instructions for operation of a hardware component of the IHS, and wherein the attestation certificate is endorsed by a self-signed root attestation certificate;
retrieve an identity certificate that is stored to the IHS, wherein the identity certificate specifies an identity of the hardware component, and wherein the identity certificate is endorsed using an embedded keypair of the hardware component; and
validate that the root attestation certificate corresponds to the hardware component that is specified in the identity certificate by confirming that a public key included in the identity certificate is identical to a public key included in the attestation certificate.

20. The IHS of claim 19, wherein the hardware component comprises an SPDM (Security Protocol and Data Model) compliant hardware component.

\* \* \* \* \*